(12) United States Patent
Bakalo et al.

(10) Patent No.: US 10,789,462 B2
(45) Date of Patent: Sep. 29, 2020

(54) WEAKLY AND FULLY LABELED MAMMOGRAM CLASSIFICATION AND LOCALIZATION WITH A DUAL BRANCH DEEP NEURAL NETWORK

(71) Applicants: International Business Machines Corporation, Armonk, NY (US); Bar-Ilan University, Armonk, NY (US)

(72) Inventors: Ran Bakalo, Haifa (IL); Rami Ben-Ari, Kiryat-Ono (IL); Jacob Goldberger, Tel-aviv (IL)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/247,596

(22) Filed: Jan. 15, 2019

(65) Prior Publication Data

US 2020/0226368 A1 Jul. 16, 2020

(51) Int. Cl.
*G06K 9/00* (2006.01)
*G06T 7/00* (2017.01)
(52) U.S. Cl.
CPC ..... *G06K 9/00536* (2013.01); *G06K 9/00523* (2013.01); *G06K 9/00671* (2013.01); *G06T 7/0012* (2013.01); *G06T 2207/30096* (2013.01)
(58) Field of Classification Search
None
See application file for complete search history.

(56) References Cited

U.S. PATENT DOCUMENTS

| | | | |
|---|---|---|---|
| 9,122,897 | B2 | 9/2015 | Hernández-Cisneros |
| 9,256,799 | B2 | 2/2016 | Wehnes et al. |
| 9,589,374 | B1 | 3/2017 | Gao et al. |
| 2018/0060722 | A1 | 3/2018 | Hwang et al. |
| 2019/0304092 | A1* | 10/2019 | Akselrod-Ballin ..... G06T 7/143 |

OTHER PUBLICATIONS

Hang et la., "GlimpseNet: attentional methods for full-image mammogram diagnosis", Stanford AI Lab Internal Report, Stanford University, 2017 (Year: 2017).*

(Continued)

*Primary Examiner* — Soo Jin Park
(74) *Attorney, Agent, or Firm* — Gregory J. Kirsch

(57) ABSTRACT

Embodiments may classify medical images, such as mammograms, using weakly labeled data sets, fully labeled data sets, or a combination of both. For example, a method may comprise receiving a whole medical image, extracting a plurality of image patches from the whole medical image, each image patch including a portion of the whole image, generating a representation of features found in the plurality of image patches, classifying each image patch as including a malignant abnormality, a benign abnormality or not including an abnormality to form a classification for each patch, in parallel, the detection branch computes a malignant distribution over patches and a benign distribution over patches resulting in ranking of patches compare to one another for malignancy, and ranking of patches compare to one another for benign. Patches classification probabilities and ranking are multiplied and summed for malignant and benign, resulting in global malignant probability and global benign probability.

20 Claims, 7 Drawing Sheets

(56) References Cited

OTHER PUBLICATIONS

Zhang et al., "Adversarial complementary learning for weakly supervised object localization", CVPR 2018, pp. 1325-1334 (Year: 2018).*

Rami Ben-Ari, "Pixel Club: Weakly Supervised Learning for Mammogram Classification", Jan. 9, 2018.

DersöRibliet al., "Detecting and Classifying Lesions in Mammograms With Deep Learning", Scientific Reports, 2018, vol. 8, Article No. 4165.

Seung Yeon Shin et al., "Joint Weakly and Semi-Supervised Deep Learning for Localization and Classification of Masses in Breast Ultrasound Images", IEEE Transactions on Medical Imaging, Sep. 24, 2018.

Pengcheng Xi et al., "Abnormality Detection in Mammography using Deep Convolutional Neural Networks", IEEE International Symposium on Medical Measurements and Applications (MeMeA), 2018.

Zhe Li et al., "Thoracic Disease Identification and Localization with Limited Supervision", IEEE/CVF Conference on Computer Vision and Pattern Recognition, 2018.

Dina Abdelhafiz et al., "Survey on Deep Convolutional Neural Networks in Mammography",IEEE 7th International Conference on Computational Advances in Bio and Medical Sciences (ICCABS), 2017.

Wentao Zhu et al., Deep multi-instance networks with sparse label assignment for whole mammogram classification, Medical Image Computing and Computer-Assisted Intervention, 2017, pp. 603-611.

Sangheum Hwang et al., "Self-transfer learning for weakly supervised lesion localization", Medical Image Computing and Computer-Assisted Intervention, 2016, pp. 239-246.

Yoni Choukroun et al., "Mammogram Classication and Abnormality Detection from Nonlocal Labels using Deep Multiple Instance Neural Network", Eurographics Workshop on Visual Computing for Biology and Medicine, 2017.

* cited by examiner

WEAKLY AND FULLY LABELED MAMMOGRAM CLASSIFICATION AND LOCALIZATION WITH A DUAL BRANCH DEEP NEURAL NETWORK

BACKGROUND

The present invention relates to techniques and a framework for classifying medical images, such as mammograms or breast Magnetic Resonance Imaging images, using weakly labeled, namely without local (instance) annotations of the findings, in the data sets, or fully labeled data sets, or a combination of both weakly and fully labeled datasets.

The most common cancer and second leading cause of death among women is breast cancer and the medical community is striving for its early detection. Mammogram or MRI analysis for breast cancer is challenging due to the high variability of breast patterns and variations in appearance, size, and shape of the abnormalities, which often make them difficult to detect and classify, even by expert radiologists. A broad variety of traditional machine learning classifiers have been developed for automatic diagnosis of different findings such as masses and calcifications, and ultimately breast cancer.

In general, given training images with category labels, a classification problem is to learn and predict the image class in testing data set. An object detection problem is to learn object detectors to indicate the location of objects in test images. In fully supervised settings, training images have bounding-box annotations for each object in the images. This is tedious, costly, and not scalable for large datasets. In the weakly supervised paradigm, only image-level tags are necessary to train a classifier. Weakly supervised methods that can provide localization, similar to fully supervised methods, provide an insight into the system reasoning process and may provide a particular high value where the source of discrimination between the classes is a-priori unknown. Weakly supervised models have therefore gained high interest in the computer vision community and in medical imaging, facilitating technological advancements in computer-aided diagnosis.

Accordingly, a need arises for techniques classifying medical images, such as mammograms, using weakly labeled (such as without local annotations of the findings) data sets, fully labeled data sets, or a combination of both weakly and fully labeled datasets.

SUMMARY

Embodiments of the present systems and methods may provide the capability to classify medical images, such as mammograms, using weakly labeled (such as without local annotations of the findings) data sets, fully labeled data sets, or a combination of both weakly and fully labeled datasets. Embodiments of the present systems and methods may provide classification and lesion detection (as a source of discrimination) that mainly uses weakly labeled data set, yet can make use of fully labeled data for boosting performance. Embodiments may utilize a dual branch Deep Neural Network (DNN) concept for image classification with localization. In embodiments, multi-class classification may provide separation between benign and malignant findings in, for example, a mammogram, in a single training process. Embodiments may provide combining fully annotated data for boosting performance in both classification and localization.

In an embodiment, a computer-implemented method for detecting abnormalities in medical images may comprise receiving a whole medical image, extracting a plurality of image patches from the whole medical image, each image patch including a portion of the whole image, generating a representation of features found in the plurality of image patches, classifying, with a classification branch, each image patch as including a malignant abnormality, a benign abnormality, or normal tissue to form a classification probability for each patch, in parallel with the classifying, determining, with a detection branch, a malignant condition distribution and a benign condition distribution over the patches to form a ranking of patches as being malignant condition and as being benign condition, equivalently comparing the malignant ranked patches to one another for malignant condition, equivalently comparing the benign ranked patches to one another for benign condition, and multiplying and summing the classification probabilities for the patches and the patch rankings for malignant condition and for benign condition to form a global malignant condition probability and a global benign condition probability for the images.

In embodiments, the method may further comprise using a dual branch model comprising classification performed using a first deep neural network having a loss function and comprising a malignant class, a benign class, and a normal class, and detection performed using a second deep neural network having a loss function and comprising a malignant class and a benign class and not a normal class. Losses for weakly labeled data and fully labeled data may be combined. The dual branch model may be trained using a one weakly labeled dataset comprising whole images, wherein the whole images do not have local annotations, or a fully labeled dataset comprising whole images, wherein at least on whole image has local annotations of findings. Determining for the whole image may comprise using a tuple of abnormality distributions and defining a normal case where the tuple vanishes, wherein the probability for malignant or benign abnormality in the whole image is substantially zero. The method may further comprise determining localization of multiple abnormality types using a combination of classification and detection scores according to $d^c(x_i) = P_{cls}(c|x_i) p_{det}^c(i|x)$ $i \in \{1, \ldots, m\}$, $c \in \{M, B\}$. The method may further comprise determining a fully-supervised loss of the classification branch as an average, over the patches, cross-entropy between each patch's true classes and predicted local probabilities according to:

$$\mathcal{L}_{Cls}^F(\theta) = -\frac{1}{\sum_{t \in [n]} m_t'} \sum_{\substack{t \in [n] \\ x(t) \in S}} \left( \sum_{\substack{i \in [m_t] \\ y_{t_i}=1}} \log(p_{cls}(M|x(t)_i) + \sum_{\substack{i \in [m_t] \\ y_{t_i}=0}} \log(1 - p_{cls}(M|x(t)_i) \right).$$

For fully labeled data, a mass of the detection branch's probability mass function concentrates on the patches with overlap determined by IoM over a certain threshold according to $$\mathcal{L}_{Det}^F(\theta) = -\frac{1}{|S|} \sum_{\substack{t \in [n] \\ x(t) \in S}} \log \left( \sum_{\substack{i \in [m_t] \\ y_{t_i}=1}} p_{det}^M(z^M = i | x(t)) \right).$$

In an embodiment, a system for detecting abnormalities in medical images may comprise a processor, memory accessible by the processor, and computer program instructions stored in the memory and executable by the processor to perform receiving a whole medical image, extracting a plurality of image patches from the whole medical image, each image patch including a portion of the whole image, generating a representation of features found in the plurality of image patches, classifying, with a classification branch, each image patch as including a malignant abnormality, a benign abnormality, or normal tissue to form a classification probability for each patch, in parallel with the classifying, determining, with a detection branch, a malignant condition distribution and a benign condition distribution over the patches to form a ranking of patches as being malignant condition and as being benign condition, equivalently comparing the malignant ranked patches to one another for malignant condition, equivalently comparing the benign ranked patches to one another for benign condition, and multiplying and summing the classification probabilities for the patches and the patch rankings for malignant condition and for benign condition to form a global malignant condition probability and a global benign condition probability for the images.

In an embodiment, a computer program product for detecting abnormalities in medical images may comprise a non-transitory computer readable storage having program instructions embodied therewith, the program instructions executable by a computer, to cause the computer to perform a method comprising receiving a whole medical image, extracting a plurality of image patches from the whole medical image, each image patch including a portion of the whole image, generating a representation of features found in the plurality of image patches, classifying, with a classification branch, each image patch as including a malignant abnormality, a benign abnormality, or normal tissue to form a classification probability for each patch, in parallel with the classifying, determining, with a detection branch, a malignant condition distribution and a benign condition distribution over the patches to form a ranking of patches as being malignant condition and as being benign condition, equivalently comparing the malignant ranked patches to one another for malignant condition, equivalently comparing the benign ranked patches to one another for benign condition, and multiplying and summing the classification probabilities for the patches and the patch rankings for malignant condition and for benign condition to form a global malignant condition probability and a global benign condition probability for the images.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide the capability to classify medical images, such as mammograms, using weakly labeled (such as without local annotations of the findings) data sets, fully labeled data sets, or a combination of both weakly and fully labeled datasets. Embodiments of the present systems and methods may provide classification and lesion detection (as a source of discrimination) that mainly uses weakly labeled data set, yet can make use of fully labeled data for boosting performance. Embodiments may utilize a dual branch Deep Neural Network (DNN) concept for image classification with localization. In embodiments, multi-class classification may provide separation between benign and malignant findings in, for example, a mammogram, in a single training step. Embodiments may provide combining fully annotated data for boosting performance in both classification and localization.

Embodiments may include a neural network architecture for simultaneous detection and classification. The network may rank patches of images for each class in the detection branch and may use the ranking to combine the patch classification probabilities to reach global decisions. The information may be fed from the classification branch to focus the detection on the most relevant patches on one hand and enforce hard negative mining on the other hand. Patches with no findings information, namely Normal patches, may be handled by adding an additional local normal class in the classification branch's softmax layer. These local normal probabilities may not be used in the final combination. In addition, cases where none of the abnormalities are present in the image, namely purely normal images, may be handled, in contrast to conventional techniques in which a pure normal image, equivalent to pure background image without objects, is not defined as a separate class. Embodiments may be insensitive to the image size and the number of the patches extracted from the image, eliminating the conventional need to warp the image to a fixed size, which often causes the distortion of the image and the lesion shape, and can strongly impact the final decision.

Figure 1:
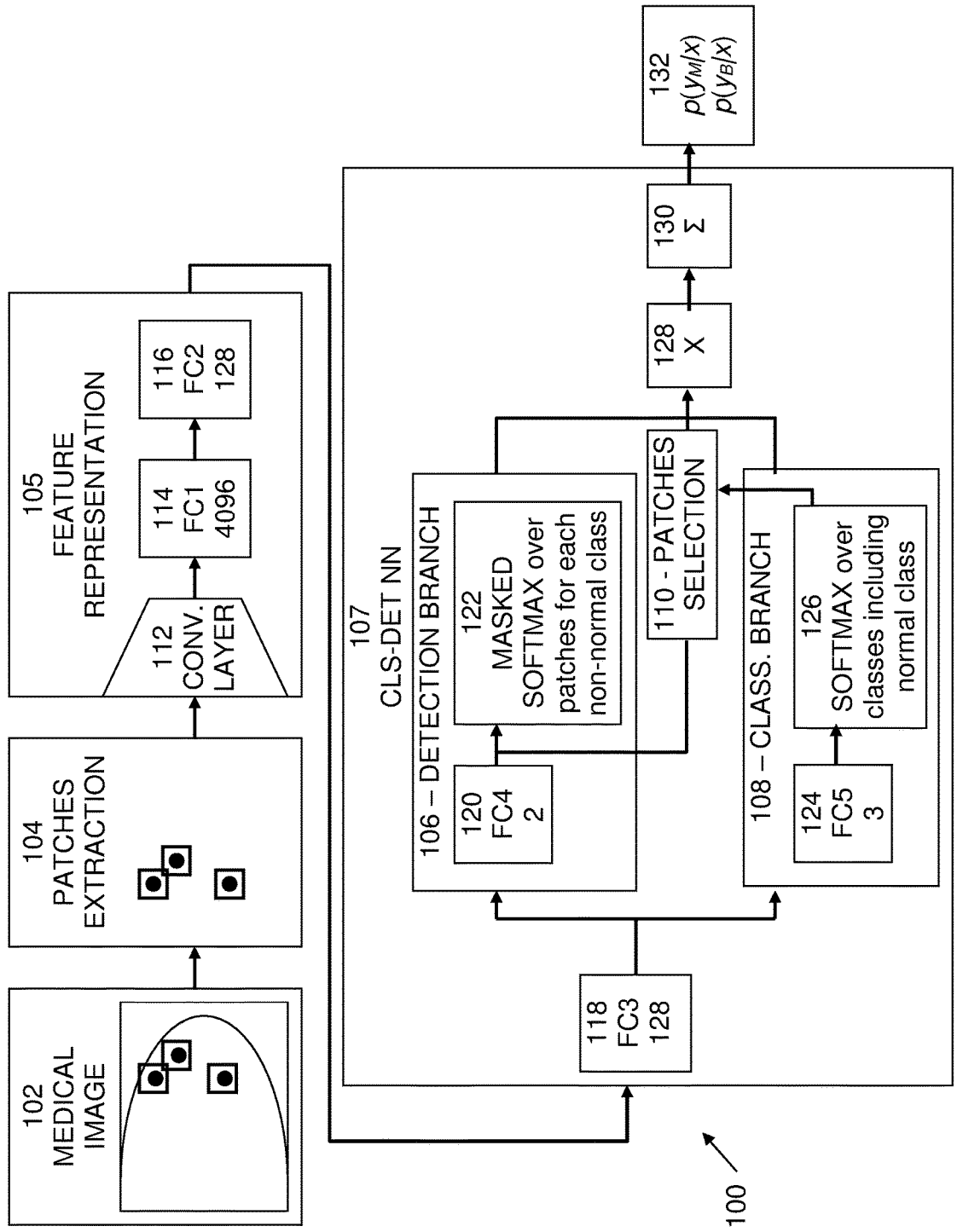
FIG. 1 illustrates an exemplary system in which described embodiments may be implemented.

An exemplary system 100, in which embodiments of the described techniques may be implemented, is shown in FIG. 1. It is best viewed in conjunction with FIG. 2, which is an exemplary flow diagram of a process of image classification 200. System 100 may receive an input medical image 102, such as a mammogram or MRI image, and may include patches extraction processing 104, feature representation processing 105, a dual-branch classification-detection neural network 107, which may include a detection branch network 106, a classification branch network 108, and a patches selection network 110. Feature representation processing 105 may include, for example, a convolutional layer 112, a first fully connected layer 114, and a second fully connected layer 116. Dual-branch classification-detection neural network 107 may include, for example, a third fully connected layer 118, detection branch network 106, which may include a fourth fully connected layer 120 and a masked softmax layer 122, classification branch network 108, which may include a fifth fully connected layer 124 and a softmax layer 126, and X 128, Σ 130, and which may output probabilities of malignant and benign findings 132 in the input image 102. Detection branch network 106 may rank patches for malignant class and for benign class. Classification branch network 108, may classify each patch to malignant, benign, or normal. Patch selection 100 may use the information of top patches according to classification branch network 108, which may be passed to detection branch network 106 as a mask for masked softmax layer 122 over patches for each non-normal class.

In the example shown in FIG. 1, a Joint Detection-Classification Network may be implemented. Embodiments may provide a network architecture that jointly performs detection of pathological findings and classification of them to different classes, such as benign or malignant. A medical image 102 may first be split by patches extraction 104 into a plurality of image patches that may be fed to the network branches. Classification branch 108 may compute local probabilities of malignant, benign, and normal for each patch, and detection branch 106 may rank patches according to their relevance to malignant and benign findings in the image. The aggregation steps 128 and 130 may combine the outputs of the branches to obtain an image-level decision 132 of malignant and benign findings. For example, multiplying step 128 may perform multiplication of the classification probabilities for the patches and the patch rankings for malignant condition and for benign condition. Likewise summing step 130 may perform summing of the classification probabilities for the patches and the patch rankings for malignant condition and for benign condition. Image-level decision 132 may form a global malignant condition probability and a global benign condition probability for the images.

Figure 2:
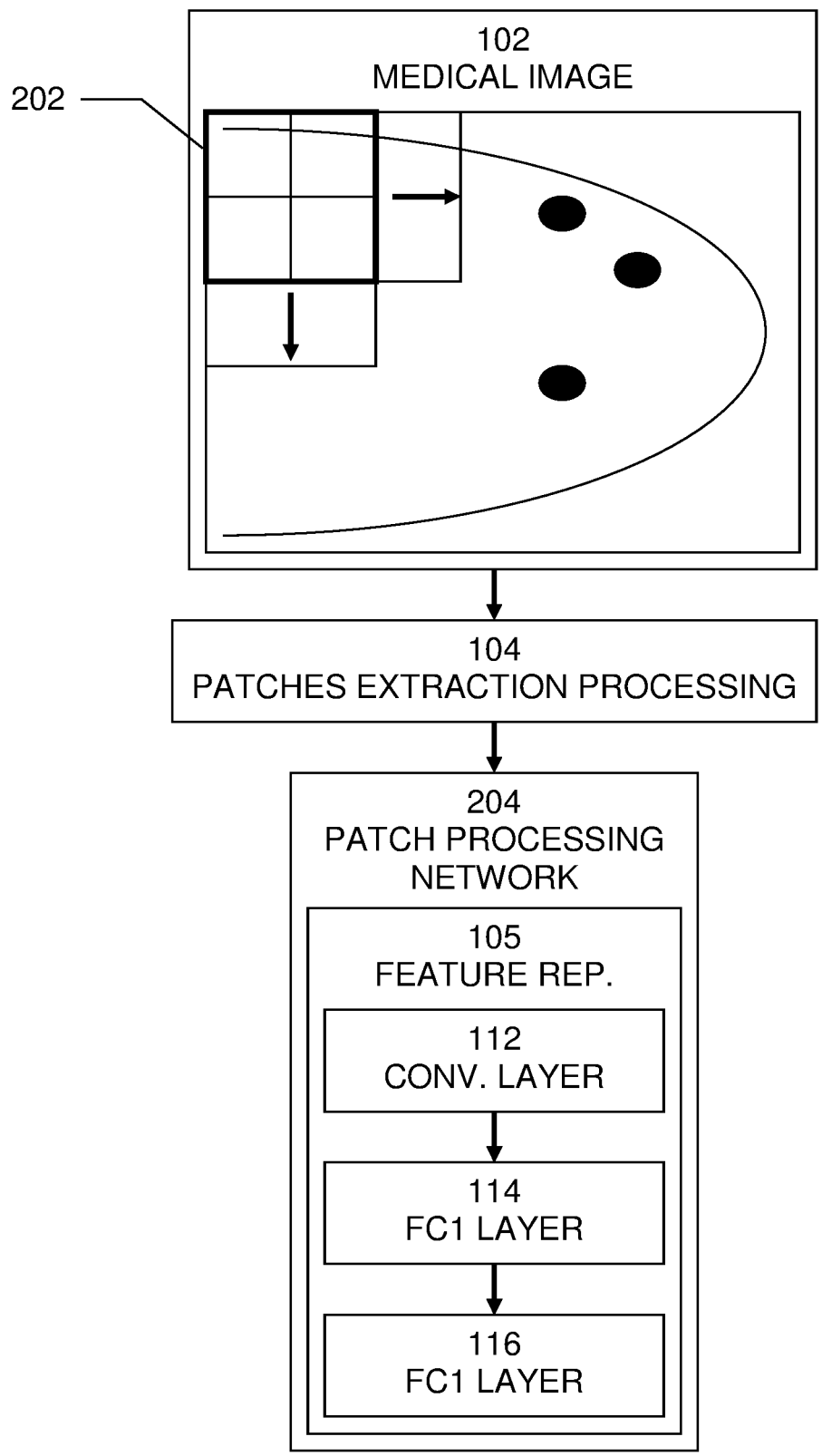
FIG. 2 illustrates patch extraction processing.

An exemplary embodiment of patch extraction processing 104 is shown in FIG. 2. Given a medical image 102, such as a mammogram or MRI image, pre-processing may be performed to extract feature representations for patches inside the image. For example, a sliding window 202 (such as 224×224 pixels) with half window (such as 112×112 pixels) stride may be used to extract overlapping window size (such as 224×224 pixels) patches inside the image. For example, with a mammography image, the patches may be extracted from the breast area of the image without the axilla. The extracted patches may be processed by patch processing network 204. In embodiments with a relatively small training data set, a two-stage deep neural network architecture may be used for patch processing. In case of sufficiently large data set the network can be trained end-to-end. In embodiments, as the first stage, a transfer learning approach may be used, for example by using the pretrained VGG128 network, trained on the ImageNet data-set. In embodiments, convolutional layer 112 may extract CNN features from the last hidden layer as 128D feature vectors for each patch. Then, each patch may be processed separately in fully connected (FC) layers 114, 116. Denote the obtained patch information of a given image x by $x=(x_1, \ldots, x_m)$ such that m is the number of patches and $x_i \in R^{128}$ is the feature vector representation of the i-th patch.

Figure 3:
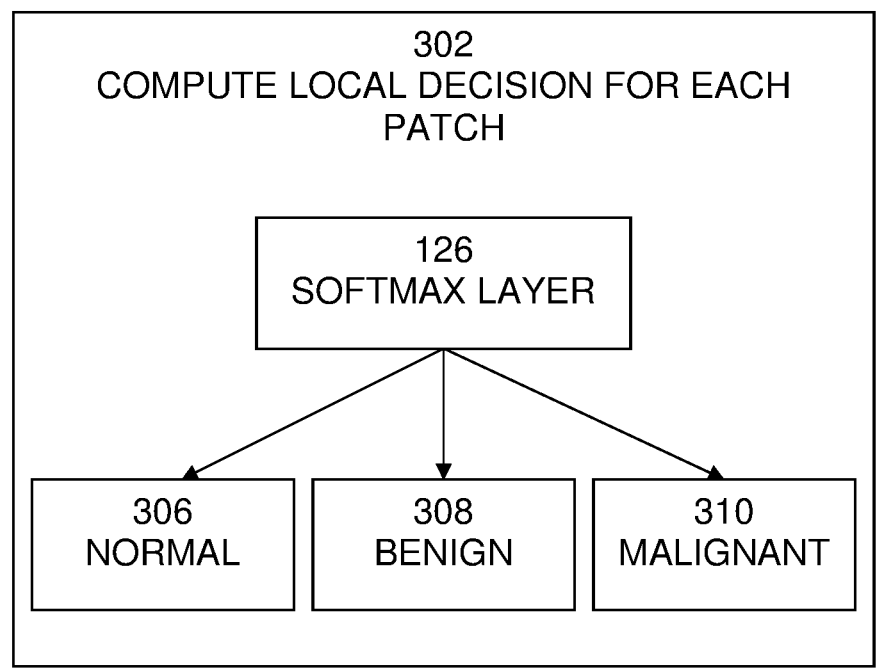
FIG. 3 illustrates classification branch processing.

An exemplary embodiment of classification branch processing 108 is shown in FIG. 3. In embodiments, processing 108 may begin with 302, in which a local decision for each patch may be computed separately. Each patch is classified as either normal (N) 306, benign (B) 308, or malignant (M) 310, using a soft-max layer 126 over classes including the normal class 306:

$$p_{cls}(c \mid x_i) = \frac{\exp(w_c^T x_i)}{\sum\limits_{d \in \{N, B, M\}} \exp(w_d^T x_i)} c \in \{N, M, B\}, i = 1, \ldots, m \quad (1)$$

such that $w_N$, $w_B$ and $w_M$ are the parameters of the classifier. Note that the same classification parameters are used across all the patches in the image.

Figure 4:
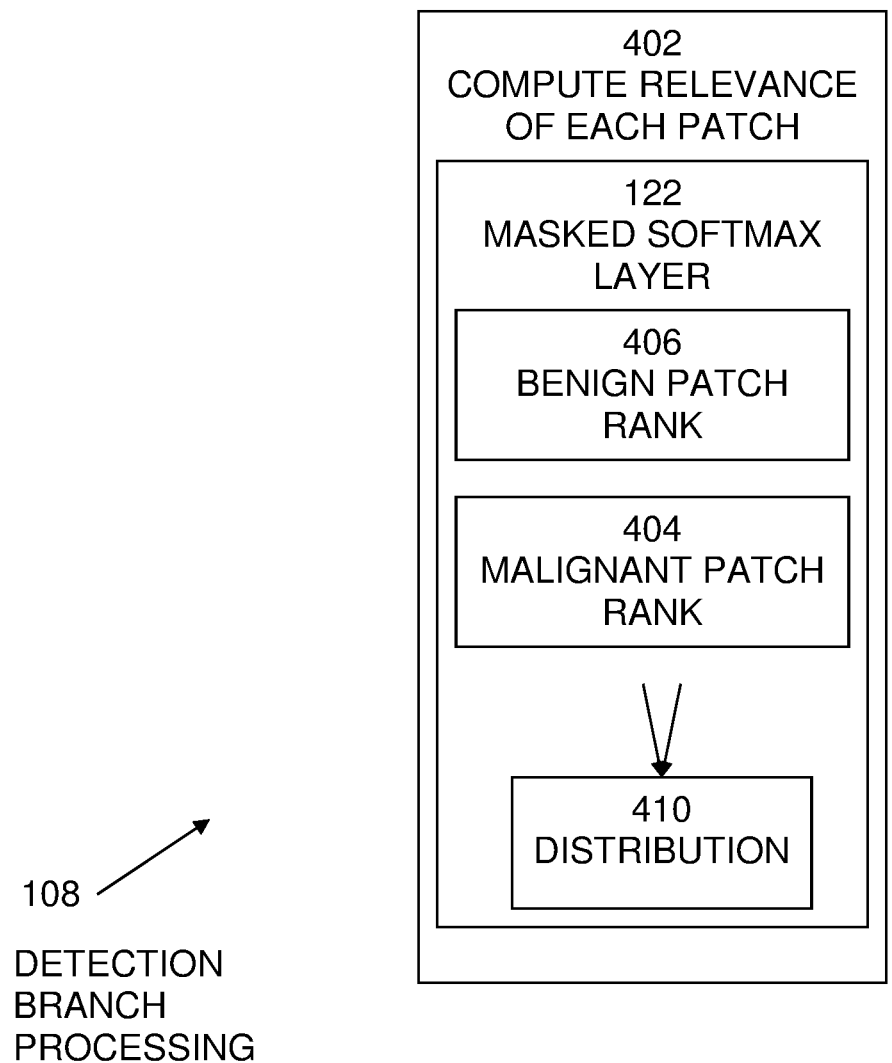
FIG. 4 illustrates detection branch processing.

An exemplary embodiment of detection branch processing 106 is shown in FIG. 4. In embodiments, detection branch processing 106 may be performed in parallel with classification branch processing 108. In embodiments, processing 106 may begin with 402, in which the rank of each patch may be computed. In embodiments, two detection processes may be performed—one for malignant class 404 and one for benign class 406. The final localization of abnormalities may be evaluated using a combination of classification and detection scores. Since normal patches are prevalent in all types of mammogram or MRI images, these patches are considered as "background" and not considered as a separate class. The detection result may be a distribution 410 over all the patches in the image. The detector may also be implemented by a masked soft-max operation 122:

$$p_{det}^c(z^c = i \mid x) = \frac{\exp(u_c^T x_i)}{\sum\limits_{j=1}^{m} \exp(u_c^T x_j)} c \in \{B, M\}, i = 1, \ldots, m \quad (2)$$

such that $u_B$ and $u_M$ are the parameter-sets of the benign and malignant detectors respectively, and $z_c$ is a random variable representing the selected patch in the c-distribution in the ranking branch.

Figure 5:
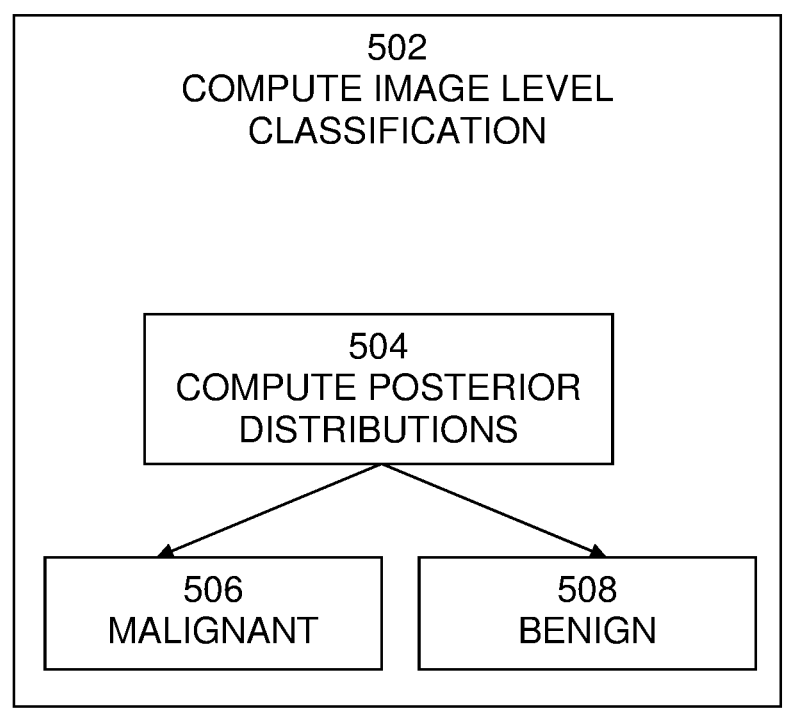
FIG. 5 illustrates image level decision processing for image level classification.

An exemplary embodiment of patches selection using image-level decision processing 110 is shown in FIG. 5. Given the patch-level classification results and the patch detection distribution, embodiments may compute 502 the image-level classification. Let $y_M$ be a binary indication whether at least one patch contains a malignant finding 506. Likewise, define $y_B$ to be 1 if there is at least one patch in the image that contains a benign or part of a benign finding 508. The posterior distributions of $y_M$ and $y_B$ given the mammogram or MRI image may be obtained 504 as a weighted average of the local decisions:

$$p(y_c = 1 \mid x) = \sum_{i=1}^{m} p_{det}^c(z^c = i \mid x) p_{cls}(c \mid x_i), c \in \{B, M\} \quad (3)$$

Note that the final class does not include the normal class N, since normal patches are highly prevalent in both {B, M} images. Normal images may be discriminated by having low probability for both benign (B) and malignant (M) findings. Embodiments may allow classification of patches to normal in the classification branch 108. This may allow the handling of patches extraction including patches without finding information and the handling of images without any findings, that is, patches and images that have neither benign nor malignant findings.

In embodiments, the detection decision may be solely based on the features that were extracted from the image pixels. In embodiments, the classification decision results may be used to guide the detection process. For example, if a patch is clearly classified as malignant then the malignancy detection should favor this patch. Information from the classification branch may be used for the detection branch. This may be formalized by a step of patch selection. Let $p_{cls}(M \mid x_1), \ldots, p_{cls}(M \mid x_m)$ be the patches probabilities of being classified as malignant. The malignant detection process 506 may only consider the patches which are among the top k patches according to the probability of being classified as malignant. A softmax operation may be applied only on these selected patches as part of the patch selection process. Let $h_M(i)$ be a binary value indicating whether patch i is selected for the malignancy detection process. The same selection criterion may be applied for the benign detector 508. Thus, each detector's ranking may be performed only on the relevant patches according to the classification branch 300. In the modified detection branch 400, the softmax over patches 408 may be replaced by a masked softmax to impose patch selection:

$$p^c_{mask-det}(z^c = i \mid x) = \frac{h_c(i)\exp(u_c^T x_i)}{\sum_{j=1}^{m} h_c(j)\exp(u_c^T x_j)} c \in \{B, M\}, \quad (4)$$

$$i = 1, \ldots, m$$

Note that if the image is indeed malignant, the malignant detector 506 may concentrate on the most malignant patches, and if the image is not malignant, the model may concentrate on the patches most wrongly classified as malignant (and similarly for benign images). Thus, embodiments may allow focusing on the most relevant patches and hard negative mining.

Training. Assume a set of n manually annotated mammography or MRI images $\{x(1), \ldots, x(n)\}$. Each image $x(t)$ is associated with a binary label $y_M(t)$ that indicates whether the image contains at least one malignant finding and a binary label $y_B(t)$ that indicates whether the image contains at least one benign finding. The network provides soft decisions for each image $x(t)$ regarding the values of $y_M(t)$ and $y_B(t)$. The objective function to maximize in the network training step is the following likelihood function:

$$L(\theta) = \sum_{c \in \{M,B\}} \sum_{t=1}^{n} \log p(y_c(t) \mid x(t); \theta) \quad (5)$$

such that θ is the parameter-set of the model and the probability $p(y_c(t) x(t); \theta)$ is defined in Eq. (3).

In embodiments, processing may be performed on, for example, a large multi-center screening data set, acquired from various devices. The method was demonstrated on a dataset including 2,967 full-filed digital mammograms (FFDM) from a BI-RADS distribution of 350, 2364, 146 and 107 corresponding to findings in the images associated with maximum BI-RADS 1,2,4 and 5 respectively. Mammograms with global BI-RADS 3 may be excluded from the data as this intermediate BI-RADS are commonly assigned based on further examinations such as Ultrasound or MRI tests. Mammograms may be included with BI-RADS 3 findings that were not a finding that was maximum BI-RADS in the image. The mammograms may contain various findings such as masses, macro, and micro-calcifications. In embodiments, the mammograms may be split into the following three global labels, BI-RADS 4,5 as malignant (M), BI-RAD 2 as benign (B) and BI-RAD 1 as normal (N). All types of suspiciously malignant abnormalities may be included into the M class to distinguish between any severe abnormality from BI-RADS 4,5, benign findings (BI-RADS 2,3) and normal images (BI-RAD 1). This data split raises a particular challenge as the model has to discriminate between images with a very similar types of lesions, such as malignant versus benign masses or different types of micro-calcifications, often ambiguous even for expert radiologists.

A performance assessment may be carried out with 5 fold patient-wise cross-validation, namely, at each train and test iteration, all the images from the patient under test may be strictly excluded from the training set.

The performance of, for example, three embodiments were determined to demonstrate the comparative performance of the suggested embodiment: a baseline method (Max patch]) and two variants of the proposed methods. The first variant (Cls-Det) is based on a parallel computing of the two branches and the second variant (Cls-Det-PS) used a patch selection procedure. Evaluation may be performed on M vs. BUN (M vs. BN) with $p(y_M=1 \mid x)$ scoring, and on MUB vs. N (MB vs. N) with max $(p(y_M=1 \mid x), p(y_B=1 \mid x))$ scoring. For performance assessment in addition to the Area Under the Receiver Operating Characteristic curve (AUROC), other measures may be considered, such as partial-AUC (pAUC), associated with the AUC at a high sensitivity level. For example, Table 1 shows the AUROC and pAUC of the evaluated methods. Table 2 shows comparison of the methods for several operation points.

TABLE 1

Comparison of AUC and normalized pAUC between the baseline and the proposed methods. Best performances are in bold

| Method | M vs. BN avg. AUC | MB vs. N avg. AUC | M vs. BN avg. pAUC sen. ≥0.8 | MB vs. N avg. pAUC sen. ≥0.8 |
|---|---|---|---|---|
| Max patch [3] | 0.70 | 0.82 | 0.23 | 0.33 |
| Cls-Det | 0.71 | 0.83 | 0.28 | 0.35 |
| Cls-Det-PS | 0.73 | 0.84 | 0.27 | 0.37 |

TABLE 2

Comparison of operation-point measures between the baseline and the proposed methods for M vs. BN and for MB vs. N. Best performances are in bold

| Method avg. Spe/Sen | M vs. BN 0.8 | M vs. BN 0.85 | M vs. BN 0.9 | MB vs. N 0.8 | MB vs. N 0.85 | MB vs. N 0.9 |
|---|---|---|---|---|---|---|
| Max patch | 0.43 | 0.36 | 0.24 | 0.59 | 0.48 | 0.35 |
| Cls-Det | 0.49 | 0.42 | 0.31 | 0.62 | 0.51 | 0.36 |
| Cls-Det-PS | 0.51 | 0.40 | 0.27 | 0.68 | 0.54 | 0.38 |

Quantitative Localization Measure. Lesions in the data set present a large scale variability. Yet, in embodiments, the patches may be at fixed size and aim to alert for a suspicious finding, rather than exact segmentation of the lesion. Therefore, embodiments may use a less strict measure for localization than standard intersection over union (IoU). Define the IoM measure as the intersection over minimum. This measure computes the ratio between the intersection of a patch's area and a finding's ground truth contour and the minimum area between the patch's area and the finding ground truth contour. To assess the localization performance, the following procedure may be applied. Define a localization score for each patch in an image x.

$$d^c(x_i) = p_{cls}(c|x_i) p_{det}^c(i|x) \quad i \in \{1, \ldots, m\}, c \in \{M, B\} \quad (6)$$

Then, given an image classified as $c \in \{M, B\}$, a subset of patches may be reported, which localize the c findings. Given a threshold, $\lambda$, return all the patches with $d^c(x_i) \geq \lambda$. Then, for all the true-positive images (TP), measure by R the fraction of images with at least one correct localization according to IoM≥0.5. In addition, measure the avg. number of false patches per image (FPPI) in the test images. Now plot an FROC curve for detection performance according to $\lambda$. In embodiments, improved localization may be obtained when using the patch selection procedure. In embodiments, mammograms may first be classified and most discriminative patches may be overlaid. Observations may show a good agreement between the model localization and radiologist annotation for the lesions.

In embodiments, the dual branch classification-detection technique may be extended in, for example, semi-supervised settings. In semi-supervised settings, part of the data may be weakly-supervised and part of the data may be fully-supervised. This may improve the M vs BN performance of the present systems and methods.

In a weakly semi-supervised approach, it is assumed that only the malignant class has a fully-supervised subset and that in the fully-supervised malignant images, only the malignant findings are annotated. It is also assumed that the annotation only gives supervision for the localization without any knowledge on the specific type of malignant finding. For example, the amount of fully-supervised images may be less than 5% of the whole data-set.

Figure 6:
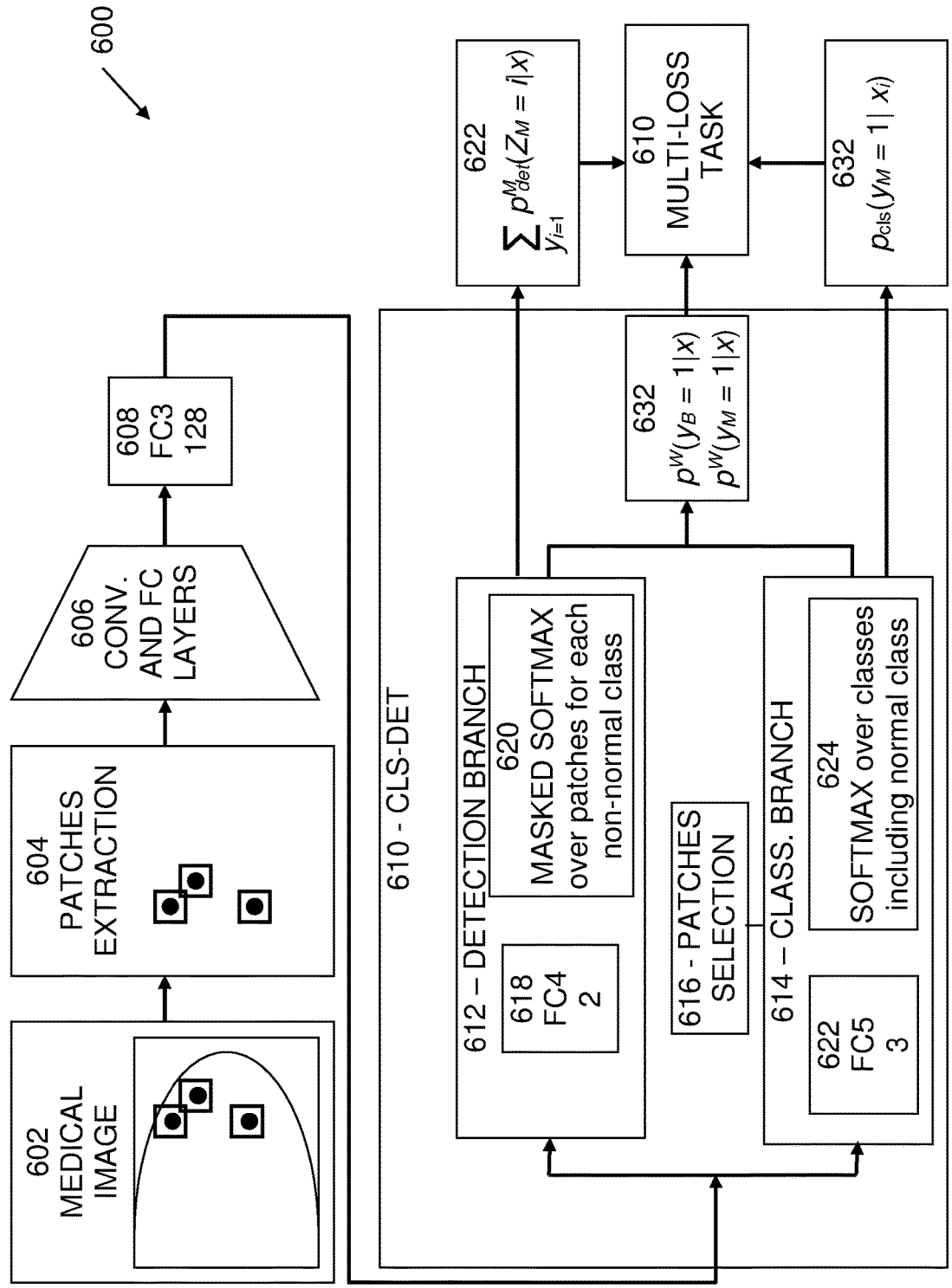
FIG. 6 illustrates an exemplary system in which described embodiments may be implemented

An exemplary system 600, in which embodiments of the described techniques, such as a weakly semi-supervised approach, may be implemented, is shown in FIG. 6. System 600 may receive an input medical image 602, such as a mammogram or MRI image, and may include patches extraction processing 604, convolution and fully connected layers processing 606, another fully connected layer 608, a dual-branch classification-detection neural network 610, which may include a detection branch network 612, a classification branch network 614, and a patches selection network 616. Detection branch network 612 may include processing to rank patches for malignant class and for benign class 618,620. Classification branch network 614 may include processing to classify each patch to malignant, benign, or normal 622, 624. Further processing 628, 630, 632 may be performed to result in multi-loss tack 634.

Weakly semi-supervised loss function. It is assumed that the training set contains two distinct sets. One set, W, contains the weakly-supervised images (those can be malignant, benign, or normal). A second set, S, contains the fully-supervised images (which may be only malignant images, or which may be images of both benign lesions and malignant lesions). It is assumed that each fully-supervised image, $X_i \in S$, has local labels for at least one type of its patches. Let the local label of j-th patch of $X_i$ image, $x_{ij}$, be $y_{ij} \in \{1, 0, -1\}$. A local patch's label is 1 if the patch has at least, for example, 0.5 IoM with a ground-truth (GT) malignant finding's contour, and 0 label if the patch has empty intersection with all the GT malignant findings' contours. In practice, some patches have non-empty intersection with malignant findings with less than 0.5 IoM or have no IoM with a malignant finding. Those patches get a local label of (−1), which means that those patches may not be included in the semi-supervised loss computation and therefore do not participate in the learning process.

Thus, for patches included in the semi-supervised loss computation, the local label is 1 if the patch is considered as malignant, and 0 if the patch is considered as either benign or normal. Denote this labeling function by l. Given an image X with a set $M_X$ of malignant GT contours and a patch x from image X, its labeling is $$l(x; X, M_x) = \begin{cases} 1 & \exists c \in M_x, IoM(x, c) \geq 0.5 \\ 0, & \forall c \in M_x, x \cap c = \emptyset \\ -1, & \text{otherwise} \end{cases} \quad (7)$$

Thus, for a training image $X_i$ with a set $M_{x_i}$ of malignant GT contours, the labeling of its j-th patch is defined by $$y_{ij} = l(x_{ij}; X_i, M_{x_i}) \quad (8)$$

In embodiments, the loss function may be modified to handle those local labels. Then, the prediction step is as in the weakly classification-detection approach. In embodiments, the loss function may be modified by separating it to a weakly supervised loss part ($\mathcal{L}^W$) and a fully supervised part ($\mathcal{L}^F$). Thus, the final loss function is $$\mathcal{L}(\theta) = \mathcal{L}^W(\theta) + \mathcal{L}^F(\theta) \quad (8)$$

Define $\mathcal{L}^W$ in same way as in the previous weakly labelled settings. In the semi-supervised settings, the loss is defined over the images train subset W. Formally, $$\mathcal{L}^W(\theta) = \quad (9)$$

$$-\frac{1}{|W|} \left( \sum_{\substack{t \in [n] \\ x(t) \in W}} \log p(y_M(t) | x(t); \theta) \right) - \frac{1}{n} \left( \sum_{t=1}^{n} \log p(y_B(t) | x(t); \theta) \right)$$

In this weakly loss function, we compute the average cross entropy between $y_M(t)$ and $p(y_M(t)|x(t); \theta)$ values in the weakly supervised subset plus the average cross entropy between $y_B(t)$ and $p(y_B(t)|x(t); \theta)$ values in all training set. In the weakly semi-supervised settings, we may have only malignant annotations in the fully-supervised subset. In such case, for the benign class the weakly loss is defined on all the train set.

A new fully-supervised loss for the malignant images in F may be added. We impose the fully supervised loss on patches enforced directly on the classification branch, $\mathcal{L}_{Cls}^F$, and directly on the detection branch, $\mathcal{L}_{Det}^F$. Then, the final fully-supervised loss may be defined as $$\mathcal{L}^F(\theta) = \mathcal{L}_{Cls}^F(\theta) + \mathcal{L}_{Det}^F(\theta) \quad (10)$$

Define the fully-supervised loss of the classification branch as the average (over the patches) cross-entropy between the patch's true classes (may be as M or −M) and predicted malignant local probabilities.

$$\mathcal{L}_{Cls}^F(\theta) = -\frac{1}{\sum_{\substack{t \in [n] \\ x(i) \in S}} m'_t} \quad (11)$$

-continued $$\sum_{\substack{t\in[n]\\x(t)\in S}}\left(\sum_{\substack{i\in[m_t]\\y_{t_i}=1}}\log(p_{cls}(M\mid x(t)_i) + \sum_{\substack{i\in[m_t]\\y_{t_i}=0}}\log(1-p_{cls}(M\mid x(t)_i))\right)$$

Define $m_i'$ as the number of patches with labeling different from (−1) in training image $X_i$ $$m_i' = \sum_{j=1}^{m_i} 1\{y_{i_j} \neq -1\} \quad (12)$$

In the fully-supervised loss of the detection branch, the ranking should concentrate on the relevant patches. Thus, the mass of the detection branch's probability mass function should concentrate on those patches. Define the detection branch loss as $$\mathcal{L}_{Det}^F(\theta) = -\frac{1}{|S|}\sum_{\substack{t\in[n]\\x(t)\in S}}\log\left(\sum_{\substack{i\in[m_t]\\y_{t_i}=1}} p_{det}^M(z^M = i \mid x(t))\right) \quad (13)$$

Figure 7:
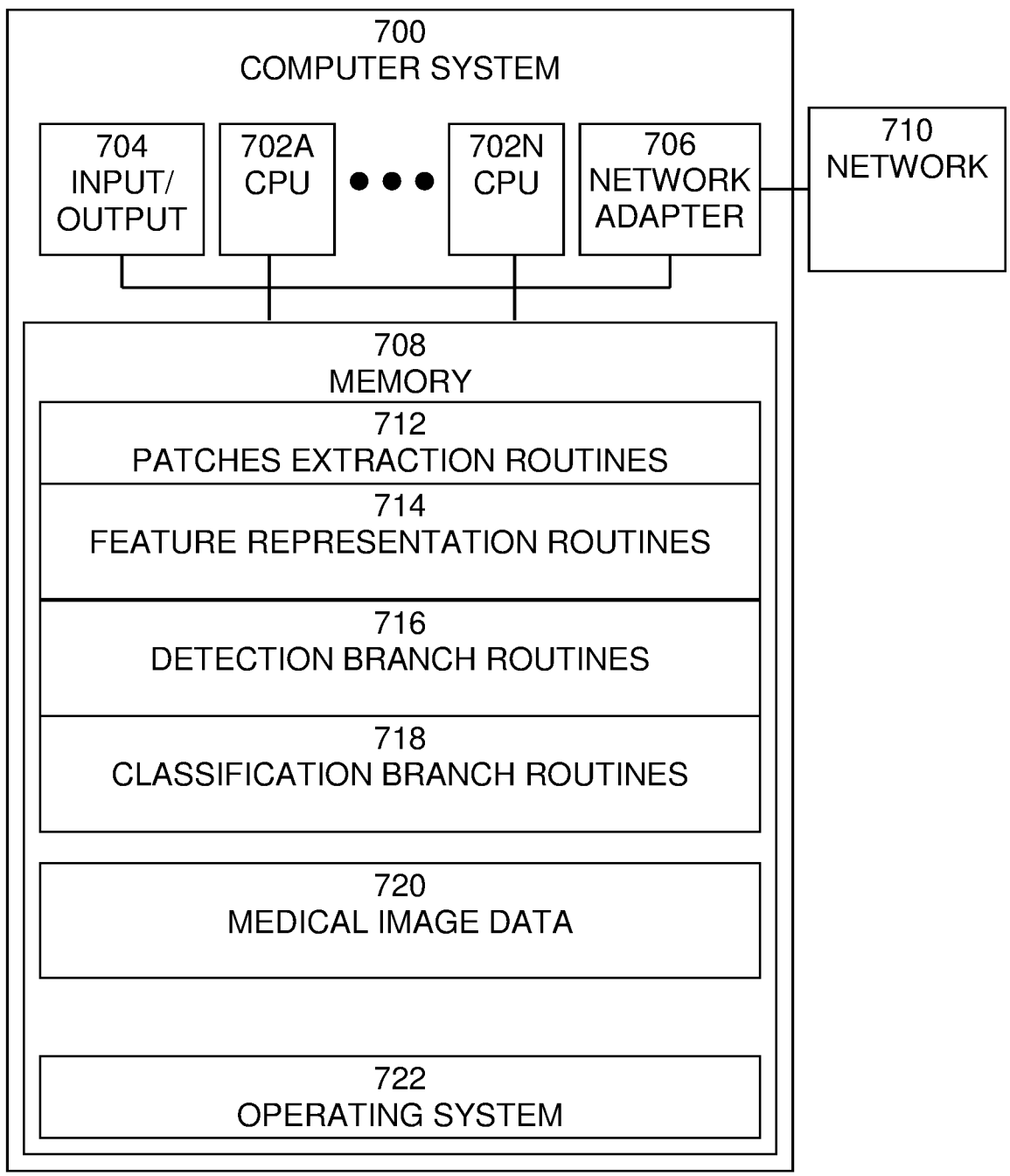
FIG. 7 is an exemplary block diagram of a computer system in which processes involved in the embodiments described herein may be implemented.

An exemplary block diagram of a computer system 700, in which processes involved in the embodiments described herein may be implemented, is shown in FIG. 7. Computer system 700 may typically be implemented using one or more programmed general-purpose computer systems, such as embedded processors, systems on a chip, personal computers, workstations, server systems, and minicomputers or mainframe computers, or in distributed, networked computing environments. Computer system 700 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present communications systems and methods also include embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 700 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 7, memory 708 may include patches extraction routines 712, feature representation routines 714, detection branch routines 716, classification branch routines 718, medical image data 720, and operating system 712. Scanning network data and routines 712 may include data and software routines to perform processing to implement a plurality of convolutional layers and may generate data to be stored. Patches extraction routines 712 may include software routines to split images included in medical image data 720 into a plurality of image patches that may be fed to the network branches. Feature representation routines 714 may include software routines to perform feature representation processing, such as using a pretrained VGG128 network, as described above. Detection branch routines 718 may include software routines to perform detection branch processing as described above. Classification branch routines 718 may include software routines to perform classification branch processing as described above. Medical image data 720 may include data relating to a plurality of medical images, such as digital images received from a medical imaging system or a medical database system for classification. Medical image data 718 may be in any standard, non-standard, proprietary, or non-proprietary image format or file format. Operating system 720 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for detecting abnormalities in medical images, implemented in a computer comprising a processor, memory accessible by the processor, and computer program instructions stored in the memory and executable by the processor, the method comprising:
   receiving a whole medical image;
   extracting a plurality of image patches from the whole medical image, each image patch including a portion of the whole image;
   generating a representation of features found in the plurality of image patches;
   classifying, with a classification branch, each image patch as including a malignant abnormality, a benign abnormality, or normal tissue to form a classification probability for each patch;
   in parallel with the classifying, determining, with a detection branch, a malignant condition distribution and a benign condition distribution over the patches to form a ranking of patches as being malignant condition and as being benign condition;
   equivalently comparing the malignant ranked patches to one another for malignant condition;
   equivalently comparing the benign ranked patches to one another for benign condition; and
   multiplying and summing the classification probabilities for the patches and the patch rankings for malignant condition and for benign condition to form a global malignant condition probability and a global benign condition probability for the images.

2. The method of claim 1, wherein each branch has a direct loss on the local probabilities in a semi-supervised setting.

3. The method of claim 2, wherein losses for weakly labeled data and fully labeled data are combined.

4. The method of claim 3, wherein the dual branch model is trained using a weakly labeled dataset comprising whole images, wherein the whole images do not have local annotations, or a fully labeled dataset comprising whole images, wherein at least one whole image has local annotations of findings.

5. The method of claim 4, wherein the determining for the whole image comprises:
   using a tuple of abnormality distributions; and
   defining a normal case where the tuple vanishes, wherein the probability for malignant or benign abnormality in the whole image is substantially zero.

6. The method of claim 4, wherein where there is an additional Normal class in the classification branch with no associated detection branch counterpart.

7. The method of claim 5, further comprising determining localization of multiple abnormality types using a combination of classification and detection scores according to:

$$d^c(x_i) = p_{cls}(c|x_i) p_{det}^c(i|x) i \in \{1, \ldots, m\}, c \in \{M, B\}.$$

8. A system for detecting abnormalities in medical images, the system comprising a processor, memory accessible by the processor, and computer program instructions stored in the memory and executable by the processor to perform:
   receiving a whole medical image;
   extracting a plurality of image patches from the whole medical image, each image patch including a portion of the whole image;
   generating a representation of features found in the plurality of image patches;
   classifying, with a classification branch, each image patch as including a malignant abnormality, a benign abnormality, or normal tissue to form a classification probability for each patch;
   in parallel with the classifying, determining, with a detection branch, a malignant condition distribution and a benign condition distribution over the patches to form a ranking of patches as being malignant condition and as being benign condition;
   equivalently comparing the malignant ranked patches to one another for malignant condition;
   equivalently comparing the benign ranked patches to one another for benign condition; and
   multiplying and summing the classification probabilities for the patches and the patch rankings for malignant condition and for benign condition to form a global malignant condition probability and a global benign condition probability for the images.

9. The system of claim 8, wherein each branch has a direct loss on the local probabilities in a semi-supervised setting.

10. The system of claim 9, wherein losses for weakly labeled data and fully labeled data are combined.

11. The system of claim 10, wherein the dual branch model is trained using a one weakly labeled dataset comprising whole images, wherein the whole images do not have local annotations, or a fully labeled dataset comprising whole images, wherein at least on whole image has local annotations of findings.

12. The system of claim 11, wherein the determining for the whole image comprises:
   using a tuple of abnormality distributions; and
   defining a normal case where the tuple vanishes, wherein the probability for malignant or benign abnormality in the whole image is substantially zero.

13. The system of claim 11, wherein where there is an additional Normal class in the classification branch with no associated detection branch counterpart.

14. The system of claim 13, further comprising determining localization of multiple abnormality types using a combination of classification and detection scores according to:

$$d^c(x_i) = p_{cls}(c|x_i) p_{det}^c(i|x) i \in \{1, \ldots, m\}, c \in \{M, B\}.$$

15. A computer program product for detecting abnormalities in medical images, the computer program product comprising a non-transitory computer readable storage having program instructions embodied therewith, the program instructions executable by a computer, to cause the computer to perform a method comprising:

receiving a whole medical image;

extracting a plurality of image patches from the whole medical image, each image patch including a portion of the whole image;

generating a representation of features found in the plurality of image patches;

classifying, with a classification branch, each image patch as including a malignant abnormality, a benign abnormality, or normal tissue to form a classification probability for each patch;

in parallel with the classifying, determining, with a detection branch, a malignant condition distribution and a benign condition distribution over the patches to form a ranking of patches as being malignant condition and as being benign condition;

equivalently comparing the malignant ranked patches to one another for malignant condition;

equivalently comparing the benign ranked patches to one another for benign condition; and multiplying and summing the classification probabilities for the patches and the patch rankings for malignant condition and for benign condition to form a global malignant condition probability and a global benign condition probability for the images.

16. The computer program product of claim 15, wherein each branch has a direct loss on the local probabilities in a semi-supervised setting.

17. The computer program product of claim 16, wherein losses for weakly labeled data and fully labeled data are combined.

18. The computer program product of claim 17, wherein the dual branch model is trained using a one weakly labeled dataset comprising whole images, wherein the whole images do not have local annotations, or a fully labeled dataset comprising whole images, wherein at least on whole image has local annotations of findings.

19. The computer program product of claim 18, wherein the determining for the whole image comprises:

using a tuple of abnormality distributions;

defining a normal case where the tuple vanishes, wherein the probability for malignant or benign abnormality in the whole image is substantially zero.

20. The computer program product of claim 19, wherein where there is an additional Normal class in the classification branch with no associated detection branch counterpart.

* * * * *